United States Patent
Weng

(10) Patent No.: US 10,582,184 B2
(45) Date of Patent: Mar. 3, 2020

(54) INSTANTANEOUS 180-DEGREE 3D RECORDING AND PLAYBACK SYSTEMS

(71) Applicant: Juyang Weng, Okemos, MI (US)

(72) Inventor: Juyang Weng, Okemos, MI (US)

( * ) Notice: Subject to any disclaimer, the term of this patent is extended or adjusted under 35 U.S.C. 154(b) by 131 days.

(21) Appl. No.: 15/368,667

(22) Filed: Dec. 4, 2016

(65) Prior Publication Data

US 2018/0160097 A1    Jun. 7, 2018

(51) Int. Cl.
| | |
|---|---|
| H04N 5/232 | (2006.01) |
| H04N 13/189 | (2018.01) |
| H04N 5/77 | (2006.01) |
| H04N 13/344 | (2018.01) |
| H04N 13/239 | (2018.01) |

(52) U.S. Cl.
CPC ....... *H04N 13/189* (2018.05); *H04N 5/23238* (2013.01); *H04N 5/77* (2013.01); *H04N 13/239* (2018.05); *H04N 13/344* (2018.05)

(58) Field of Classification Search
None
See application file for complete search history.

(56) References Cited

U.S. PATENT DOCUMENTS

| | | | | |
|---|---|---|---|---|
| 5,130,794 A * | 7/1992 | Ritchey | ............... | F41G 7/30 348/39 |
| 6,144,347 A * | 11/2000 | Mizoguchi | ......... | G02B 27/0172 345/8 |
| 6,549,650 B1 * | 4/2003 | Ishikawa | ............. | G02B 27/2264 382/154 |
| 7,535,498 B2 * | 5/2009 | Segman | .................. | G02B 23/10 348/239 |
| 8,736,967 B1 * | 5/2014 | Browne | ............. | G02B 27/0172 359/668 |
| 9,075,231 B2 * | 7/2015 | Welker | .................. | G02B 27/017 |
| 2002/0109785 A1 * | 8/2002 | Hammack | ............... | G02B 23/18 348/376 |
| 2004/0257648 A1 * | 12/2004 | Mogamiya | ............. | G02B 23/12 359/407 |
| 2006/0098277 A1 * | 5/2006 | Huang | ...................... | G02B 7/06 359/409 |
| 2011/0241976 A1 * | 10/2011 | Boger | ................. | G02B 27/0172 345/8 |
| 2012/0098971 A1 * | 4/2012 | Hansen | ................ | H04N 5/2258 348/164 |

(Continued)

*Primary Examiner* — Sunit Pandya

(57) ABSTRACT

The term instantaneous in this invention means that the roughly 180° horizontal visual field of view that a human senses in real time. The major novelty of the instantaneous 180° (i180°) 3D technology includes (a) a combination of multiple binocular and monocular fields of view for image acquisition, (b) a combination of binocular and monocular fields of view in content playback, (c) a multi-resolution scheme for sensing, processing, transmission, and playback, (d) a realization of physical consistency of the line of sight with minimal distortion of all projection lines between imaging and display, and (e) a method for two-way compatibility for systems with conventional binocular 3D and monocular 2D systems. In addition to applications in consumer electronics, the invention has potential applications in professional business, such as film industry, theaters, museums, advertisements, surgery, rehabilitation, and assistance to the handicapped and elderly.

10 Claims, 5 Drawing Sheets

(56) References Cited

U.S. PATENT DOCUMENTS

| | | | | |
|---|---|---|---|---|
| 2013/0083064 A1* | 4/2013 | Geisner | .................... | G06F 3/011 345/633 |
| 2015/0358539 A1* | 12/2015 | Catt | ........................ | G06T 7/593 348/38 |
| 2017/0192232 A1* | 7/2017 | Katz | ..................... | G02B 27/017 |
| 2017/0200296 A1* | 7/2017 | Jones | ....................... | G06T 11/60 |
| 2017/0214907 A1* | 7/2017 | Lapstun | ............... | H04N 13/302 |

* cited by examiner

INSTANTANEOUS 180-DEGREE 3D RECORDING AND PLAYBACK SYSTEMS

REFERENCES CITED

U.S. Pat. No. 6,529,331 A April 2001 Massof et al.
20060139448 A December 2004 Hyeong-Seok Ha et al.
20150234455 A May 2015 Lavalle et al.
20100079356 A April 2010 Hoellwarth

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

PRIOR ART

The present invention is about a method of imaging and display that provides an instantaneous nearly 180° 3D imaging and playback. Although nearly 180° is a primary application mode, the total horizontal angle of imaging and display is not limited to 180°. It can cover any wide angle up to a full 360°. Furthermore, the total vertical angle is not limited to the examples show in the figures either. For example, the two-eye fused field of view for imaging and display can be a hemispherical dome.

More specifically, the design of the invention takes advantage of the partial overlap in two fields of view of the left eye and the right eye, respectively. The overlapped part of two fields view amounts to 3D depth perception. The non-overlapped parts are monocular and does not provide visual parallax, but they expand the simultaneous field of view to be nearly a half sphere. The border of the overlapped and non-overlapped parts in human visual system is present and measurable by controlled experiments, but the subjective perception of such a border is weak and subconscious, probably largely due to the impressive visual learning in the brain and the lower visual acuity away where the border resides.

On one hand, wide-screen monocular displays such as IMAX and Dome theaters give a wide field of view, but they are monocular—do not give depth perception caused by visual disparities. On the other hand, 3D displays such as 3D movie and 3D head-mount displays do give depth perception. However, their field of view is limited. The present invention provides a new method for imaging and display that allows both an instantaneously wide field of view and the 3D perception for objects in the overlapped subfield of view.

In a modern virtual reality head-mount displays (HMDs) there is a tradeoff between field-of-view, the number of pixels in a display panel, and cost. For example, a consumer grade headset, Oculus Rift, compromises the field of view although 3D display is allowed. A relatively narrow field of view gives an impression of viewing through a small window. Although the small window can turn to access different part of the scene at different time, a wide field of view is not available instantaneously. The instantaneous 180° 3D or instantaneous hemispherical 3D in the present invention could provide a more immersive experience in movie/content production, movie theaters, advertisements, museums, rehabilitation, surgery, virtual reality and electronic games. When used in machine learning where a human interactively teaches a machine learning system in real time. Such a new method of imaging and display provides a more immersive experience for the machine learner and a more teacher consistent experience because what a machine can see instantaneously is consistent to what the human teacher can. This enables a more powerful machine and results in fewer human trainer errors.

Another HMD Virtual reality headset, StarVR, expands the typical field of view to 210°×130° using a single panel of display with a large number of pixels. High-cost Fresnel lenses, those composed of many lenses for each eye are required. However, it does not probably render 3D since no 3D related information has been given. This invention adds a considerably low-cost half-resolution monocular panel to each of the two eyes, taking advantage of the lower acuity in human eye's peripheral areas. Consequently, the instantaneous horizontal field of view is increased to 360° but both the number of total pixels, the amount of data to render, to store, and transmit only moderately increase. Therefore, we expect that the cost of the display device only moderately increases from the traditional head-mount displays. A similar moderate-cost increase can be expected for the imaging equipment and the projection equipment for I180° 3D movie theaters compared with their 2D counterpart.

The wide FOV HMD disclosed in U.S. Pat. No. 6,529,331 also uses a field of view around 180°. They achieve this field of view using a large number of display panels that are each angled from each other to make the illusion of a curved screen. However, it probably does not provide 3D as no 3D related information has been provided. If this invention used a large number of display panels, these angles and breaks between panels would have fall into high-acuity eye regions, likely noticeable by the human viewers, reducing quality of perception. In contrast, this invention only introduces two breaks that fall into a low-acuity area of each eye. Like the border of the wind shield of a car, these two breaks, if the corresponding panels are probably linked to minimize the gap, are likely not too noticeable.

Current virtual reality headsets are created to play games and watch pre-made content. These headsets play content after creation in a creation-playback cycle. There are no connections to an external camera to display instantaneous recordings from a connected camera.

Current virtual reality headsets use either one screen split physically or two separate screens to create a binocular display showing overlapping images for each eye. This single screen per eye cannot show the full peripheral view without a large curved screen. This can be created by multiple screens separated by a small non-noticeable bezel between each screen.

Backward compatibility to a 2D viewing is important so that all content for the HMD does not have to be exclusively 3D. The method developed by Samsung Electronics Co., Ltd. And outlined in U.S. Patent No. 2006/0139448A1 (filed Dec. 29, 2004) allows for the switch between 2D and 3D seamless by automatically detecting the type of stream. This technology allows for certain areas of the screen be 3D while others are not.

BRIEF SUMMARY OF THE INVENTION

The present invention includes an imaging system in which two cameras are properly positioned and aimed so that the central field of view is 3D with a high resolution, while the left and right peripheral fields are monocular to provide a very wide overall field of view.

The present invention also includes a rendering system in which a wide field of view and high resolution. This rendering system instantaneously displays the contents from the imaging system. This allows the user to feel like they are at the event being imaged in real time. Such events may also be previously recorded and played back later.

The rendering system can be in a theater with a very wide screen or dome. The viewers wear stereo glasses (e.g., polarized or electronic shutters) that enable each eye to only see one of the two images. Alternatively, the rendering system can be a wearable system whose display panels are very close to the viewer's eyes so that wide viewing angles are provided within such a small wearable device. E.g., a virtual reality head mounted display (HMD) is connected to the imaging system, wired or wirelessly, in real time or offline through a storage device or Internet.

The rendering system uses close to a full field of human vision at around 180° horizontally. It uses high resolutions in the center and lower resolutions in the peripheral views. This contains the cost without lowering the overall immersive experience.

To display, one embodiment of the invention uses at least two panels with degrading resolution in the peripheral area. The panels are curved to make the screen equidistant from the lenses in all areas. In another embodiment, the screens are separated into four screens to allow for an angle between the center views and the peripheral views. In this embodiment, the screens are joined as closely as possible as to not draw away from the experience.

The present camera's footage is optimized to be viewed on the present HMD. The footage is backward compatible to be viewed on any stereoscopic device. The recording of only one camera can be used to be backward compatible to any viewing device in two-dimensions.

To reduce the strain during long-term viewing, the design aims to minimize the weight imbalance. For example, the mobile phone for video playback is mounted on the back of the head to counter balance the weight of the front component of the display goggle.

If the projection line of every pixel in image acquisition has the same 3D direction as the projection line of the corresponding pixel during image rendition, the physical projection consistency is maintained. This consistency is necessary for applications that require such a consistency, such as physical aiming, physical shooting, and physical manipulation. The quality of this consistency maybe affected by the lens distortion of cameras and the distortions of display panels, but can be minimized through calibration using digital image processing software or hardware.

The downward compatibility is desirable: It is desirable for contents from conventional 3D and 2D systems to be displayed on any i180 systems from this invention.

The upward compatibility is also useful: the i180° 3D contents can be viewed on any 3D and 2D systems without the full i180° 3D capacity.

The i180° 3D two-way compatibility standard (2CS) is downward and upward compatible with conventional 3D and 2D standards for images and video without any modification of existing systems. It uses a multi-level system of file name extensions, with low to high from right to left.

DETAILED DESCRIPTION OF THE INVENTION

A system between a head mounted display and a 3D camera is disclosed. In this system the head mounted display is connected to the 3D camera over an Internet connection. The connection allows for the camera's recorded contents to be instantaneously displayed on the HMD. Both the camera and the HMD are connected to hosts that are used to send and receive data. In one embodiment this host is an Internet enabled mobile phone.

Figure 2:
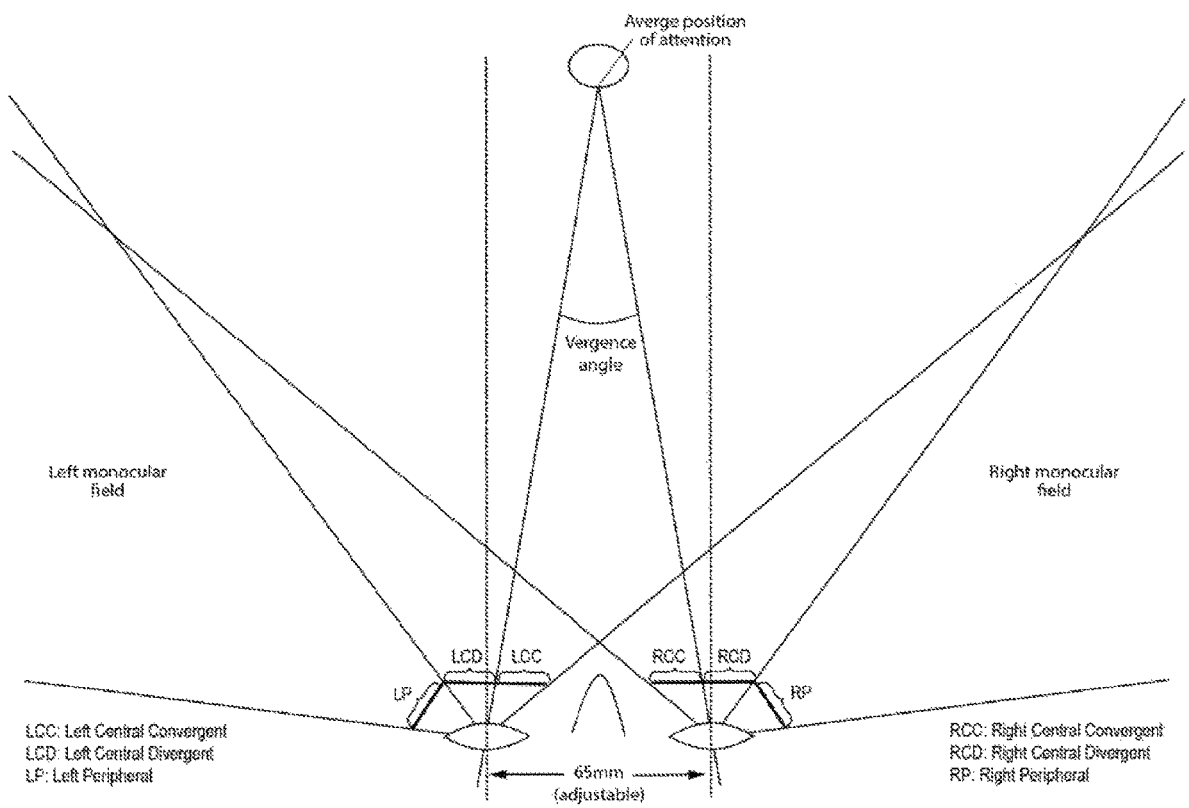
FIG. 2 shows a diagram of the design for the display configuration, consistent to the imaging configuration. The total viewing angle of the display spans the desired 180° instantaneously. Optionally, the combined field of view of the two cameras can span the entire hemisphere.

A wide field of view, high resolution virtual reality head mounted display is also disclosed. The headset uses lenses and at least two screens to achieve a 180° field of view horizontally. Each eye will contain a 135° view with at least 90° of a binocular area, per eye. FIG. 2 shows an example of how the eyes and screens are arranged along with showing how this will create a 180° field of view.

In FIG. 2, the two central areas for each eye, labeled LCD, LCC, RCC, and RCD, make up the binocular area of the display. The outer areas, RP and LP in FIG. 2, make up the monocular areas for their respective eye. This monocular area is an important difference from a traditional headset. The monocular area adds the peripheral view of each eye that is missing in traditional headsets.

Figure 3:
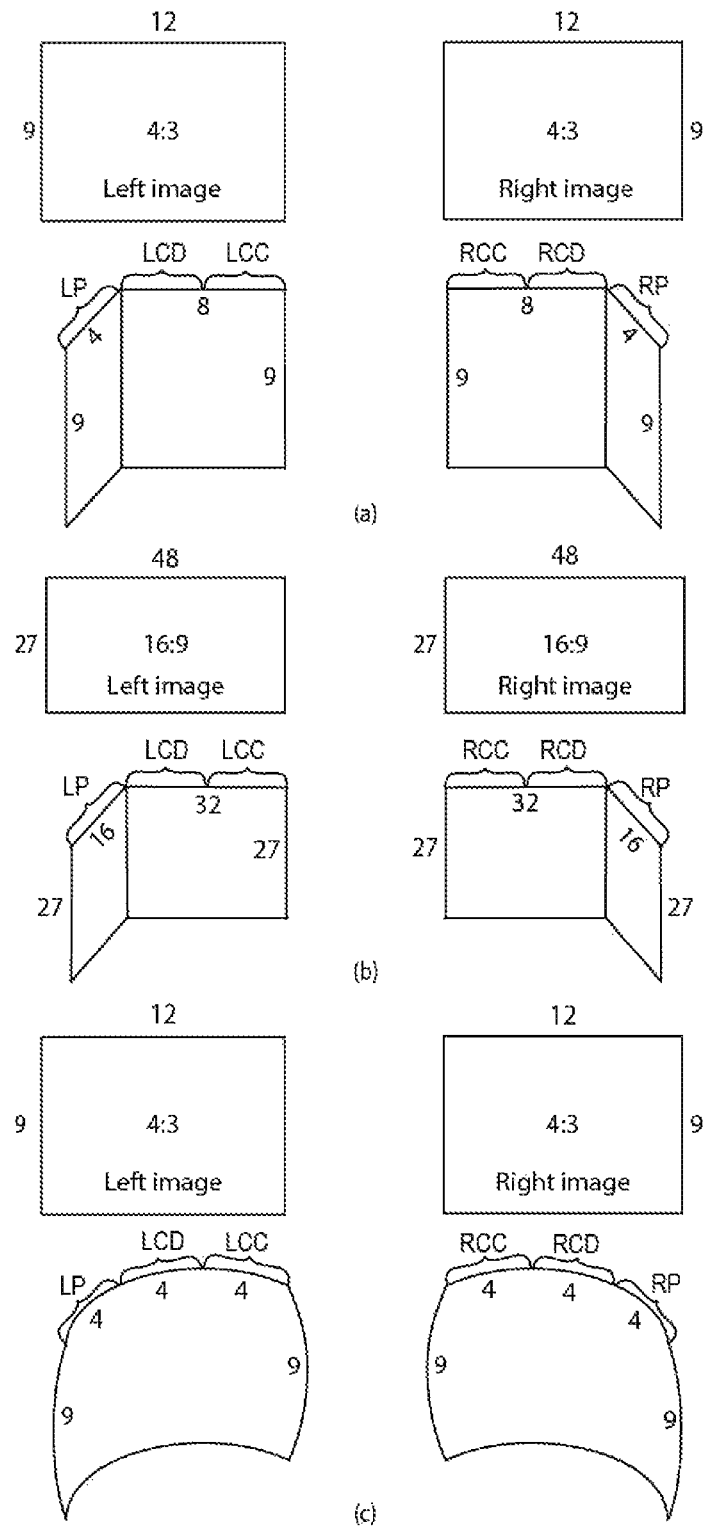
FIG. 3 shows three implementation examples of the display panels including aspect ratios and the individual display panels, flat or curved.
Figure 4:
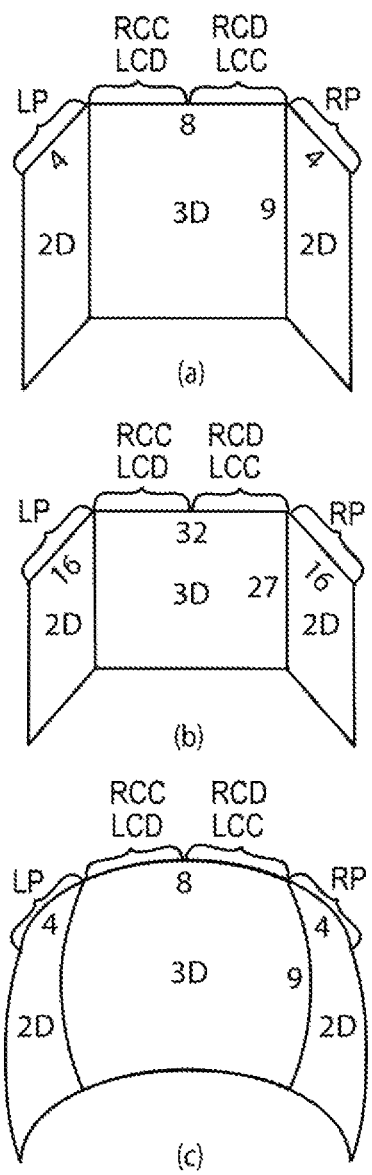
FIG. 4 shows three implementation examples of the two-eye fused, subjective fields of view that collectively spans the 180° instantaneously.
Figure 5:
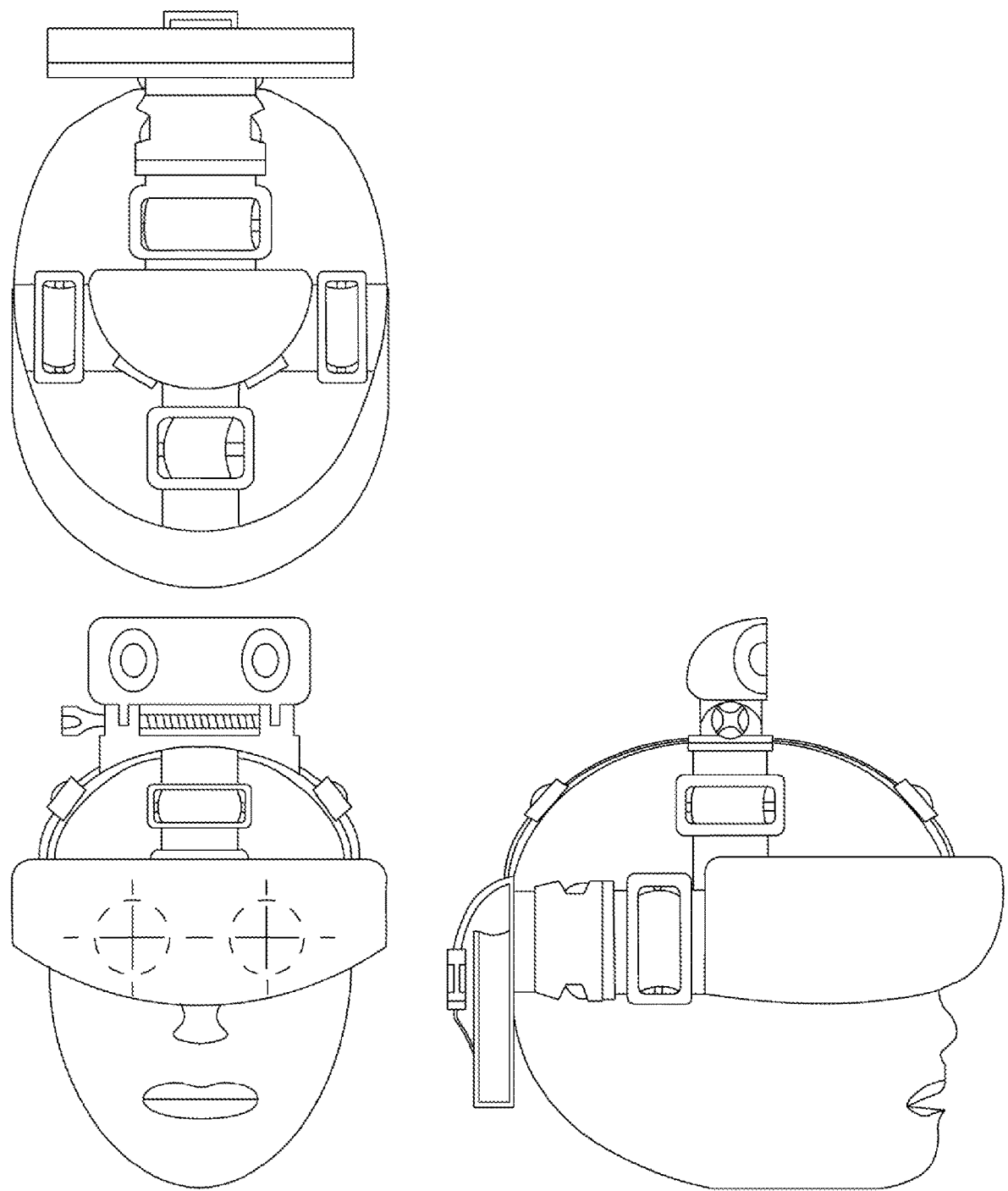
FIG. 5 shows a wearable display in which the rendering device is on the rear of the head for counter balance.

One embodiment of the invention contains 2 curved screens to achieve the 180° field of view. An example of this setup can be seen in FIG. 3 (c). Each curved screen has a point at which the resolution jumps to a lower resolution to save money on each screen, labeled RP and LP on FIG. 3 (c).

Another embodiment of the present invention uses 4 flat panel screens for the field of view. An example of this setup can be seen in FIGS. 3 (a) and (b). Each of the center two screens contain a higher resolution, labeled LCD, LCC, RCC, and RCD on FIGS. 3 (a) and (b). The peripheral outer screens contain a resolution lower than that of the two center screens, labeled RP and LP in FIGS. 3 (a) and (b).

These lower resolutions on the peripheral section or screen each make the cost of the headset lower. Another benefit to this change in resolution is a decrease in network bandwidth. For example, a resolution decreases 50% horizontally and vertically in the peripheral areas. Because the peripheral areas are one half the size horizontal to the binocular area, the two peripheral areas require only oneeighth of the bandwidth for the central binocular area. The decrease does not reduce the quality of the experience as the acuity of human vision in the peripheral views, where the decrease occurs, is greatly lower than the central areas with the full resolution.

To see the display correctly the invention includes viewing lenses for each eye that magnify and create the effect that the user is in the world being displayed. Included on the headset is an adjustor for the distance between each eye along with the height of the lenses to make the headset adjustable to best suit each user. This adjustability allows for users who wear glasses to not need their glasses while using the invention.

A far-away-from-eye display are exposed to both eyes and therefore, requires a particular technique that make each eye see the correct image meant for it. There are multiple ways to create this effect. In one embodiment, the headset uses anaglyph to separate the images for each eye. This is outlined in U.S. Patent 20020021832 (filed Jun. 28, 2001). In another embodiment, the headset uses polarization to make the eye see its correct contents. This process is outlined in U.S. Patent 20070008406 (filed Jul. 10, 2006). In another embodiment, electronic shutter is used to show the left and right images alternating quickly while making each eye only see its correct contents. This process is outlined in U.S. Patent 20050117216 (filed Nov. 24, 2004). In yet another embodiment, the headset uses a physical barrier to separate each eye's view. This ensures that each eye is seeing the correct images at all times.

Figure 1:
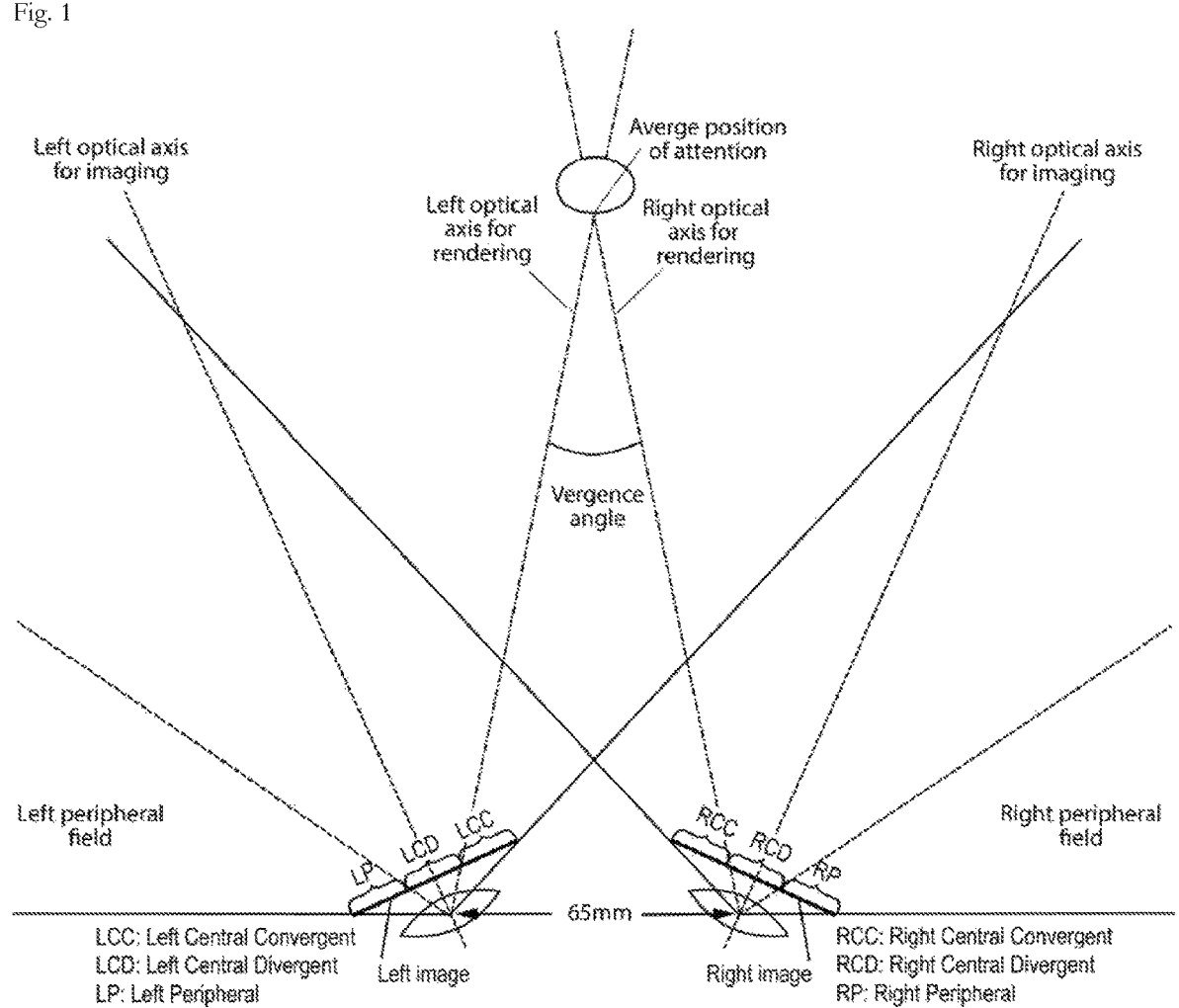
FIG. 1 shows a diagram of the design for the imaging configuration, consistent to how the human eyes form their fields of view. The two cameras do not aim convergently or in parallel as in traditional configurations. Instead, the two cameras diverge, to form the required six fields of view: Left Peripheral, Left Central Divergent, and Left Central Convergent for the left camera and Right Central Convergent, Right Central Divergent, and Right Peripheral for the right camera. The total viewing angel of the display spans the desired 180° instantaneously. Optionally, the combined field of view of the two cameras can span the entire hemisphere.

In a near-eye display (e.g., HMD), the display panels are very close to the eyes so that each eye can see the image from the only correct side of the panels meant for it only without the need of any techniques in the previous paragraph. In such a near-eye display, the panel distance from the eye is important as each panel must display an exact field of view. FIG. 1 and FIG. 2 show how this is relevant. If the display is moved any further away the field of view will be too small.

The headset requires a host which is connected to the headset via a port, such as micro-USB, or wirelessly, such as a Wi-Fi connection. The host provides a computational center for a machine learning engine. In one embodiment the host is a portable device. As an example, a high-end smartphone could be used as a host.

In embodiments using a smartphone as host, the headset has a mount on the rear of the head for the host. The HMD may have connectors here for the host and the weight of the host will be used as a balance for the HMD. This balance will make long sessions less of a strain on the user's neck.

The headset includes features to improve the physical experience. The headset may include vents within the viewing area designed to allow heat and humidity out of the headset. In one embodiment, this vent is equipped with one, or more, fan(s) to keep air moving in and out of the headset.

The headset may include a structure for supporting itself using the face, especially the nose, in a comfortable way. In one embodiment, this is a foam strip that can accommodate for multiple face shapes or for eyeglasses. This structure will separate the user from touching the lenses and to keep them from becoming dirty from eyes, eyelashes or other things touching them. This structure is not the main support point as too much weight on the nose will make the headset uncomfortable quickly.

A wide-angled, binocular camera system is also disclosed. The camera system uses two wide-angle, fisheye lens cameras.

The cameras are split apart so that they capture video from the angles a human eye would capture. Each is synchronized to the other camera so that recordings are of identical timings.

The cameras footage is stitched together simultaneous to capture. This allows for the video to be displayed immediately on a connected device. The system contains a system to correct the distorted image from the fisheye lenses.

The present invention includes cameras that use a fixed focal length for more consistent capture of video. Each also uses auto focus and auto exposure.

The present invention is equipped with microphones, accelerometers, and gyroscopes. These sensors allow for the camera to relay the movement and sound to the recording and the simultaneous display on the connected device.

The camera system connects to a host using a Wi-Fi connection or using a micro-USB connection. In one embodiment the host is a portable device. As an example, a high-end smartphone could be used as a host. The host provides a computational center for image rendering and possibly also for machine learning.

The two-way compatibility scheme of i180 3D uses a three-level file name extension. For example, myfile.i180.left.jpg has three levels of file name extension, level 1: jpg, level 2: left, level 3: i180. The I180° imaging system generates three images (or video files or live video links), e.g., myimage.i180.left.jpg, myimage.i180.right.jpg, myimage.i180.per.jpg. The base file name for image display is only myimage.i180.left.jpg (or myimage.i180.right.jpg) where the level-three file extension i180 tells an i180-capable system that it is a i180 format having two additional files.

First, consider a monocular viewer. For example, "viewer myimage.i180.left.jpg" by a conventional monocular image viewer "viewer" only loads and displays myimage.i180.left.jpg in its monocular display, because it does not have the capability of i180. Likewise, "viewer myimage.i180.right.jpg" by the conventional monocular image viewer "viewer" only loads and displays myimage.i180.right.jpg.

Second, consider a conventional stereo viewer. There have been a few stereo file naming conventions, such as myfile.left.jpg, myfile.right.jpg, or myfile.l.jpg, myfile.r.jpg. The second-level extension, left or l, and right or r, tells the stereo viewer the other file that is available. A stereo viewer "stereoviewer" executing a commend "stereoviewer myfile.i180.left.jpg" will, after loading myfile.i180.left.jpg, alsomyfile.i180.right.jpg. Likewise, "stereoviewer myfile.i180.right.jpg" will also load, after loading myfile.i180.right.jpg also loading myfile.i180.left.jpg.

Third, consider an i180 viewer. A stereo viewer "i180viewer" executing a commend "i180viewer myfile.i180.left.jpg" will load not only myfile.i180.left.jpg but also next myfile.i180.right.jpg and finally myfile.i180.per.jpg, where myfile.i180.per.jpg is the file name for left peripheral view and the right peripheral view. If only myfile.i180.per.jpg is not found, the i180viewer shows a 3D view with both the peripheral panels black (but reports "periphery is not found" if reporting error flag is turned on). This means that the i180viewer is downward compatible with contents from traditional 2D devices. If, furthermore, myfile.i180.right.jpg is also not found, the i180viewer only displays the file myfile.i180.left.jpg on both central panels, left and right (but reports "only one view is found" if reporting error flag is turned on). This means that the i180viewer is downward compatible with contents from traditional 1D devices.

The same two-way compatibility scheme applies to other type of software and hardware functions, such as copy and network connections.

Traditionally, if a software needs a few different files, it takes the file name stem, e.g., myfile, as input. Then it generates and deals with other file with the corresponding one-level file extensions, such as myfiles.jpg and myfile.tiff. The proposed three-level scheme for file name extension enables not only an i180 system to use contents from conventional 3D and 2D systems with degenerated capabilities, but also allow conventional 3D and 2D systems to utilize contents from i180 systems with their own originally designed full capabilities.

What is claimed is:

1. A method for binocular recording and binocular playback, comprising: a recording device having two cameras whose imaging process uses three fields of view—central binocular, left monocular, and right monocular—to form an instantaneous 180° horizontal field of view, and two playback devices having two image displays using three fields of view—central binocular, left monocular, and right monocular—to form an instantaneous 180° horizontal field of view, where a left camera corresponds to the left monocular field of view and the left view of the central binocular field of view and a right camera corresponds to the right monocular field of view and the right view of the central binocular field of view, wherein two 3D projection directions of the two cameras (or playback devices') intersect in 3D to give a perception of depth.

2. The binocular recording method of claim 1 wherein the two cameras are either video cameras or film recorders that record a time-varying sequence onto a recording medium.

3. The binocular recording method of claim 1 wherein the two cameras are still cameras that record two static images on a recording medium.

4. The binocular playback method of claim 1 wherein the two binocular displays are film projectors, video projectors, or TV screens that display a time-varying sequence from a recorded medium.

5. The binocular playback method of claim 1 wherein the two binocular displays are static image projectors or image displays that display a static view from a recorded medium.

6. In the recording and playback method of claim 1, if the playback device is mounted on the head of a human viewer, the part of the playback device that controls the display is mounted at the back of the head of the human viewer while a separate image display is mounted at the front of the human viewer.

7. The method of claim 1, where the 3D projection direction of each pixel of each of the two cameras of the imaging process is the same as the 3D projection direction of the corresponding pixel of the playback device, wherein the 3D projection direction of each pixel is determined by (A) for the imaging cameras, starting from the projection center (i.e. focal point) of the camera going through the center of the corresponding pixel and (B) for the playback devices, starting from the projection center (i.e. focal point) of the playback device going through the center of the corresponding pixel.

8. An apparatus for binocular recording or binocular playback, comprising: a recording device having two cameras whose imaging process uses three fields of view—central binocular, left monocular, and right monocular—to form an instantaneous 180° horizontal field of view, and two playback devices having two image displays using three fields of view—central binocular, left monocular, and right monocular—to form an instantaneous 180° horizontal field of view, where a left camera corresponds to the left monocular field of view and the left view of the central binocular field of view and a right camera corresponds to the right monocular field of view and the right view of the central binocular field of view, wherein two 3D projection directions of the two cameras (or playback devices) intersect in 3D to give a perception of depth, and wherein the 3D projection direction of each pixel is determined by (A) for the imaging cameras, starting from the projection center (i.e. focal point) of the camera going through the center of the corresponding pixel and (B) for the playback devices, starting from the projection center (i.e. focal point) of the playback device going through the center of the corresponding pixel.

9. The apparatus of claim 8, wherein the 3D projection direction of each pixel during the imaging process is the same as the 3D projection direction of the corresponding pixel during the playback process.

10. A specific scheme for assigning postfixes of the names of the files that store video/images in claim 8, where a file name stem has multiple levels of postfix extensions wherein the first level is the image format, the second level is the location of the eye, and the third level is i180 or absent.

* * * * *